UNITED STATES PATENT OFFICE.

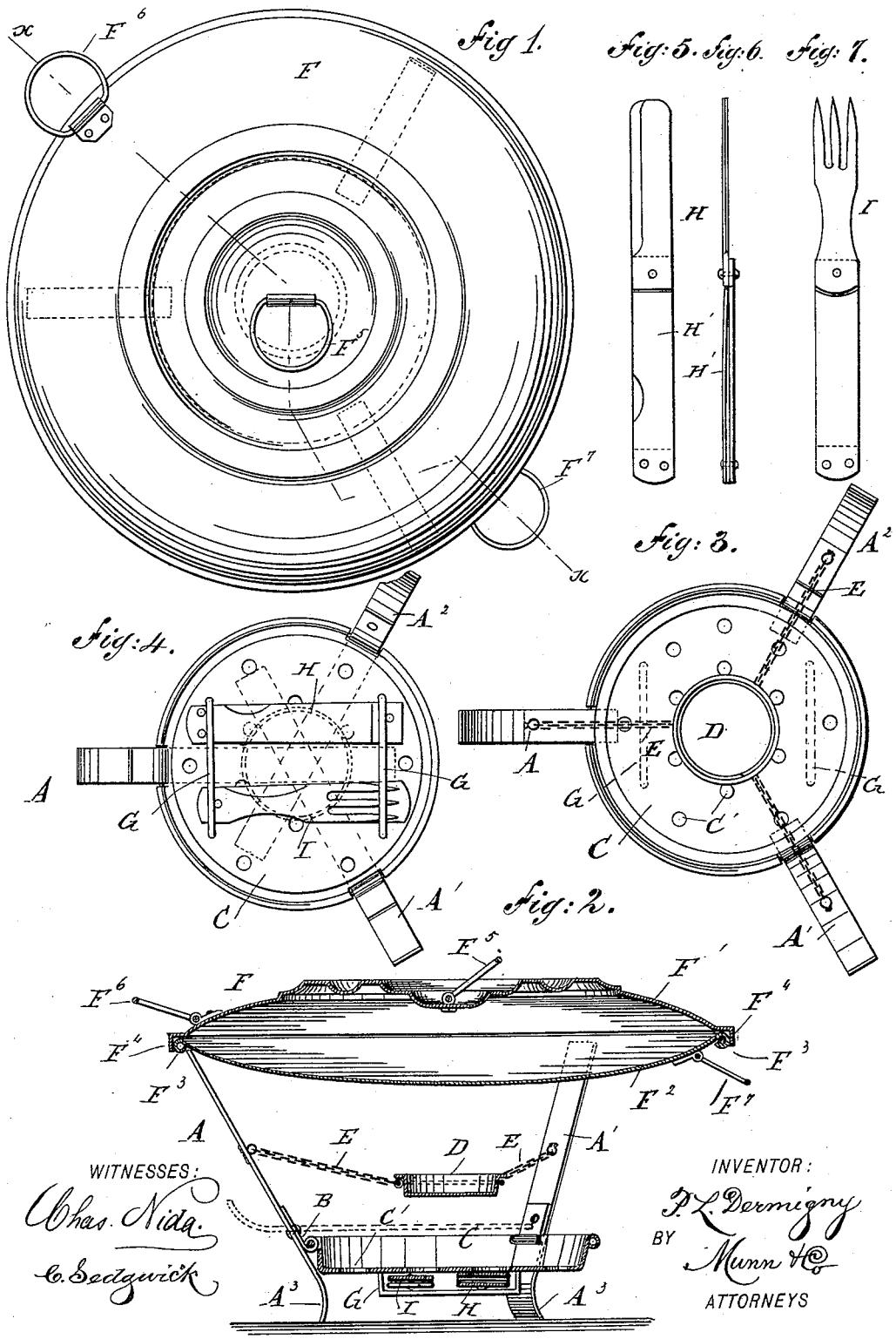

PAUL L. DERMIGNY, OF NEW YORK, N. Y.

COOKING APPARATUS.

SPECIFICATION forming part of Letters Patent No. 463,495, dated November 17, 1891.

Application filed February 6, 1891. Serial No. 380,480. (No model.)

*To all whom it may concern:*

Be it known that I, PAUL L. DERMIGNY, of the city, county, and State of New York, have invented a new and Improved Cooking Apparatus, of which the following is a full, clear, and exact description.

The object of the invention is to provide a new and improved portable cooking apparatus which is simple and durable in construction, can be readily folded, and is more especially designed for the use of tourists, hunters, yachtmen, &c., to enable them readily and quickly to cook meat, vegetables, &c., the apparatus forming a convenient place for the storage of the meat, vegetables, &c., previous to cooking.

The invention consists of legs pivoted to an apertured base adapted to support a dish or vessel made in two parts fitting air-tight one on the other.

The invention also consists of certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line $x\,x$ of Fig. 1. Fig. 3 is a plan view of the base and legs. Fig. 4 is an inverted plan view of the same in a folded position. Fig. 5 is a plan view of the knife. Fig. 6 is a side elevation of the same, and Fig. 7 is a plan view of the fork.

The improved cooking apparatus is provided with a number of legs $A\,A'\,A^2$, each having on its inner side a hinge B, connected with the upper edge of a dished base C, formed in its bottom with openings C' for the admission of air to the fuel to be burned on top of the base C. When the legs $A\,A'\,A^2$ are in an extended position, as shown in Fig. 2, the upper parts of the said legs extend upward and outward, while the lower curved parts $A^3$ extend inward and are intended to rest on the ground or other convenient support, so as to hold the base C a suitable distance above the ground. The outward motion of the upper parts of the legs $A\,A'\,A^2$ is limited by the part below the hinge B, abutting against the side of the base C. When the legs are folded, the upper parts extend into the base C, as is plainly shown in dotted lines in Fig. 4.

Instead of using the base C for burning the fuel, a separate dish D or a sponge saturated with alcohol may be employed, arranged above the base C and hung on chains E, attached to the upper parts of the legs $A$, $A'$, and $A^2$. On this dish D a lamp may be placed for heating the cooking-vessel F, supported on the upper ends of the legs $A$, $A'$, and $A^2$. If the dish D is not used, the fuel burned on the base A is intended to heat the cooking-vessel. The latter is made in two parts $F'$ and $F^2$, each made in dish shape, their bases being fitted one on the other, as is plainly shown in Fig. 2. The lower part $F^2$ is provided on its outer edge with a rim $F^3$, adapted to be engaged by an annular flange $F^4$, projecting downward from the base of the upper part $F'$. The said flange $F^4$ fits snugly upon the rim $F^3$, so that when the two parts are placed one on the other an air-tight joint is formed, so as to exclude all outer air.

The meat, vegetables, or other articles to be cooked are placed in the vessel F and cooked, the air being excluded.

On top and in the center of the upper part of the vessel F is arranged a ring $F^5$ for conveniently carrying the vessel F about—that is, placing it on or taking it off of the legs $A$, $A'$, and $A^2$. On one side of the upper part $F'$ is arranged a second ring $F^6$, and a similar ring $F^7$ is secured on the under side of the part $F^2$, the said rings serving to conveniently draw the two parts $F'$ and $F^2$ apart.

On the under side of the base C are secured suitable keepers G for conveniently supporting a knife H and a fork I, used for cutting and lifting the meat, vegetables, &c., after the same are cooked. The knife H and the fork I have their blades hinged to the handles, so that the said blades can be conveniently folded upon the handle, thereby taking up very little room. The knife H has the front part $H'$ of its handle made in the shape of a spring, which can be pressed outward to permit of folding the knife-blade between the back of the handle and the said spring $H'$. When the knife-blade is extended, as shown in Figs. 5 and 6, the free straight edge of the spring $H'$ is adapted to abut against the inner end of the knife-blade, so as to hold the latter in place and prevent its closing accidentally.

The operation is as follows: When the legs A, A', and A² are folded into the base C and the knife and fork are held in the keepers G, then the apparatus can be conveniently carried, as it takes up very little room.

The meat, vegetables, &c., to be cooked are placed between the two parts F' and F² of the vessel, so that the latter forms a place for the storage of the food.

When the device is to be used, the knife and fork are removed from the keepers G and the legs A A' A² are extended, as shown in Fig. 2, the lower curved ends A³ resting on a suitable support. The vessel F is placed on the free ends of the legs A, A', and A², and then a fire is started on the base C, so that the vessel F is heated and the meat and vegetables contained therein are cooked. Usually paper or other suitable fuel is burned on the base C to cook the meat or vegetables sufficiently to make them palatable. When this has been accomplished, the vessel F is removed from the legs A, A', and A². The upper part F' of the vessel F is then taken off of the lower part F² and the meat or vegetables can now be eaten, the said parts F' and F² serving as dishes. If desired, the legs A A' A², with their base C, can be placed in an upside-down position, so that the curved parts A³ form a rest for one of the parts F' or F², thus forming a table for the latter.

The knife and fork are used for cutting and lifting the meat, &c.

Having thus described my invention, what I claim as new, and desire to secure by Letters Patent, is—

1. A cooking utensil formed of two concave dishes held together at their edges and forming a shallow air-tight vessel, the upper dish having a central concavity in its upper side and a handle in the concavity below the plane of said upper side, whereby when the upper dish is removed and inverted for use as a plate or saucer the handle will be out of the way and permit the plate or saucer to rest flat or level on the table or other support, substantially as set forth.

2. A cooking apparatus consisting in the fuel-receptacle C, having legs hinged between their ends to the rim thereof, an auxiliary alcohol-receptacle D, removably suspended by chains from the legs above the receptacle C, and the utensil F, formed of the two dishes F' F², held together at their edges and supported by the upper ends of the legs, substantially as set forth.

PAUL L. DERMIGNY.

Witnesses:
THEO. G. HOSTER,
E. M. CLARK.